United States Patent [19]
Hwang

[11] Patent Number: 5,829,894
[45] Date of Patent: Nov. 3, 1998

[54] DATA SWITCH AND DATA SWITCHING METHOD FOR BI-TRONICS PRINTER

[75] Inventor: Chih-Bin Hwang, Taipei, Taiwan

[73] Assignee: Action Star Enterprise Co., Ltd., Taipei-Hsien, Taiwan

[21] Appl. No.: 694,624

[22] Filed: Aug. 9, 1996

[51] Int. Cl.[6] .................................................. B41J 29/38
[52] U.S. Cl. ............................................ 400/54; 395/114
[58] Field of Search .................................. 400/61, 76, 54, 400/74, 692, 719; 395/114, 112, 113

[56] References Cited

U.S. PATENT DOCUMENTS

| | | | |
|---|---|---|---|
| 3,219,785 | 11/1965 | Allison | 400/719 |
| 4,426,166 | 1/1984 | Bowling | 400/62 |
| 5,090,830 | 2/1992 | Kroeger et al. | 400/76 |
| 5,303,067 | 4/1994 | Kang et al. | 395/114 |
| 5,418,891 | 5/1995 | Yang | 395/114 |
| 5,541,582 | 7/1996 | Wagner et al. | 395/114 |

*Primary Examiner*—Edgar S. Burr
*Assistant Examiner*—Steven S. Kelley
*Attorney, Agent, or Firm*—Jacobson, Price, Holman & Stern, PLLC

[57] ABSTRACT

The present invention discloses a data switch for a Bi-Tronics printer that keeps the Bi-Tronics printer in the use of data switch by adding a controller circuit which provides simulating responding signals to a disconnected computer. When the data switch is turned to different position, that is, the Bi-Tronics printer is in fact disconnected with the computer, a pseudo signal will be provided by the controller circuit to deceive the computer that the printer is still connected. Therefore, the driver of the Bi-Tronics printer in computer could not detect the abnormal condition of the Bi-Tronics printer, so that, the error massage will not appear on the screen and the data switch could still function properly between the computer and the Bi-Tronics printer without interrupting the user.

3 Claims, 12 Drawing Sheets

5,829,894

DATA SWITCH AND DATA SWITCHING METHOD FOR BI-TRONICS PRINTER

BACKGROUND OF THE INVENTION

1. Field of the Invention

This invention relates in general to a data switch for printer, and more particularly to a data switch for Bi-Tronics printer.

2. Description of Related Art

Data switch is used for sharing printers by computers. Due to limitations in hardware and firmware, computers work in Centronics mode before Bi-Tronics mode is developed, that is, a computer sends out commands of printing, then a printer receives and executes these printing instructions. The communication between computer and printer is uni-directional. Therefore, multiple computers can share a printer using a data is switch as disclosed in U.S. Pat. No. 3,219,785 by Allison filed Feb. 1, 1960, which reveals the basic structure of the data switch used in computer nowadays, also termed "rotary switch". Its principle is to connect the printer port of selected computer with the printer by rotating the switch to predetermined position according to the distribution of internal circuits. Then a user can rotate the rotary switch to switch the printer to each corresponding computer. Besides rotary switch, push switch or other types of manual or mechanical switch can be used in three types of connection: one-to-multiple, multiple to-one, or multiple-to-multiple.

However, this kind of data switch is usable for the printers in Centronics mode, but is not usable for newly developed printers which work in Bi-Tronics mode. The reason is that the driver of the Bi-Tronics printer resides in the memory of the computer, and keeps in communication with the printer. The computer will check the status of the printer frequently, and the printer responds its status to the computer. That is Bi-Tronics, e.g. bi-directional communication. When there are errors occur in the printer such as lack of paper, loose cable, etc., the error status will be displayed on the computer to remind the user to resolve the trouble. Such kinds of new features make the computer smarter, but also make data switch useless, therefore the user has no choice but only to dispose one printer for one computer, four printers for four computers, etc. Since most of the printers are idle, such kind of disposition is uneconomic.

It is predictable that if a conventional data switch is used on Bi-Tronics printers, when the switch is rotated to a different position, the communication between the computer and the printer will be interrupted. Therefore, since the computer can not receive the response of the Bi-Tronics printer, it will display an error message on screen, to remind the user to reconnect the cable, which will disturb the user.

Since such kind of disturbance occurs once after a period, e. g. one second, and will happen again and again, until the printer driver is removed from memory, or the cable is reconnected by the user. Thus, it is apparent that the conventional data switch is not applicable to the Bi-Tronics printers, such as HP Laser Jet 4L, 4P, 5L, and 5P, and other new generation printers by Canon, Fujitsu, etc.

SUMMARY OF THE INVENTION

It is a primary object of the present invention to provide a data switch which is not only usable for the printers in Centronics mode, but also usable for the printers work in Bi-Tronics mode.

It is therefore an object of the present invention to provide a multiple-to-one data switch for Bi-Tronics printers.

It is therefore an object of the present invention to provide a one-to-multiple data switch for Bi-Tronics printers.

It is therefore an object of the present invention to provide a multiple-to-multiple data switch for Bi-Tronics printers.

The present invention of a data switch achieves the above-identified objects by adding a controller circuit which provides simulating responding signals to a disconnected computer. When the data switch is turned to different position, that is, the Bi-Tronics printer is in fact disconnected with the computer, a pseudo signal will be provided by the controller circuit to deceive the computer that the printer is still connected. Therefore, the driver of the Bi-Tronics printer in computer could not detect the abnormal condition of the Bi-Tronics printer, so that, the error message will not appear on the screen and the data switch could still function properly between the computer and the Bi-Tronics printer without interrupting the user.

It is another object of the present invention to provide a data switching method allowing a data switch to functionate properly between a computer and a Bi-Tronics printer.

A still further object of the present invention is to provide a data switch that the power of the controller circuit is coming from the signals of the computer and printer.

Yet another object of the present invention is to provide a data switch that prevents the disconnected computer from sending print commands to the Bi-Tronics printer.

Since the structure of the data switch according to the present invention is based on the conventional data switch, it is appropriate for conventional rotary switch, push switch or other type of manual switch to achieve the above mentioned objects.

BRIEF DESCRIPTION OF THE DRAWINGS

Other objects, features, and advantages of the present invention will become apparent by way of the following detailed description of the preferred but non-limiting embodiments. The description is made with reference to the accompanying drawings in which:

FIG. 1 is a diagram illustrating the 25-pin connectors of the output port of the printer and the computers, wherein CON1 is the connector of computer A, CON2 is the connector of computer B, and CON3 is the connector of printer;

FIG. 2 is a diagram illustrating the circuit of a micro controller according to the present invention and its related circuits;

FIG. 3 is a power supply circuit diagram of the circuits shown in FIG. 2;

FIG. 4 shows the configuration of connection of switches of a two-to-one data switch;

FIG. 5 is a schematic diagram of the connection of the data switch and the connectors according to the present invention;

DESCRIPTION OF THE PREFERRED EMBODIMENT

Figure 1:
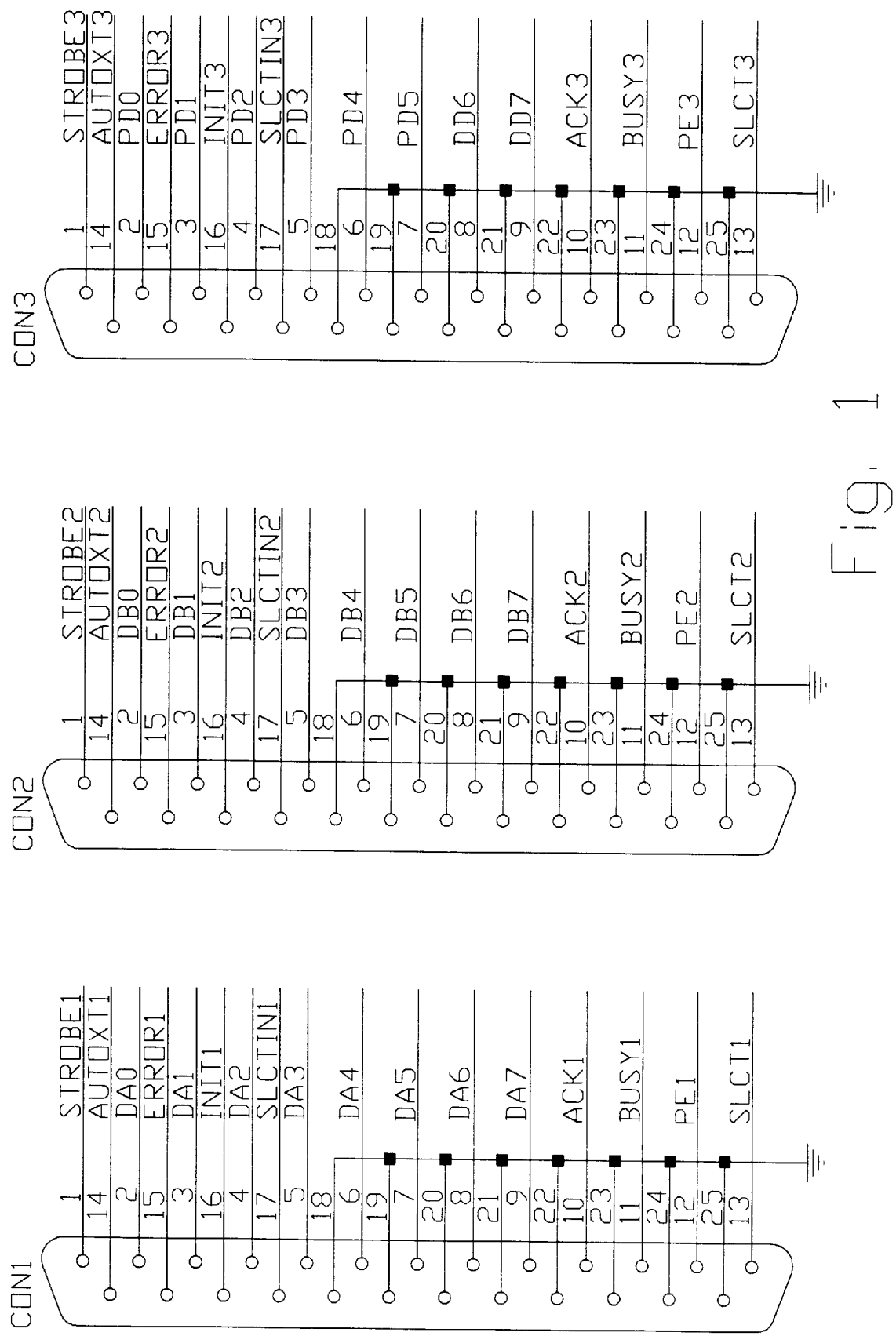
FIGS. 1 to 5 are the circuit diagrams of a two-to-one data switch according to the present invention illustrating the connection of circuits.

Please refer to FIGS. 1 to 5, which are the circuit diagrams of a two-to-one type data switch. FIG. 1 shows the pins of a 25 pin D-type connector of a printer port of a computer. The numbers from 1 to 25 represent the number of the pins of the connector, the other affixed number 1 represents computer A, 2 represents computer B, 3 represent connector of printer. Pin 1 is STROBE. Pin 14 is AUTOXT. Pin 15 is ERROR. Pin 16 is INIT. Pin 17 is SLCTIN. Pin 2 DA0 (DATA0) to pin 9 DA7 (DATA7) are not used by the present invention and have same connection as that of conventional data switch, therefore it will not be discussed hereinafter. Corresponding pins DB0~DB7 of CON2 AND PD0~PD7 of CON3 are all the same.

Figures 2, 3:
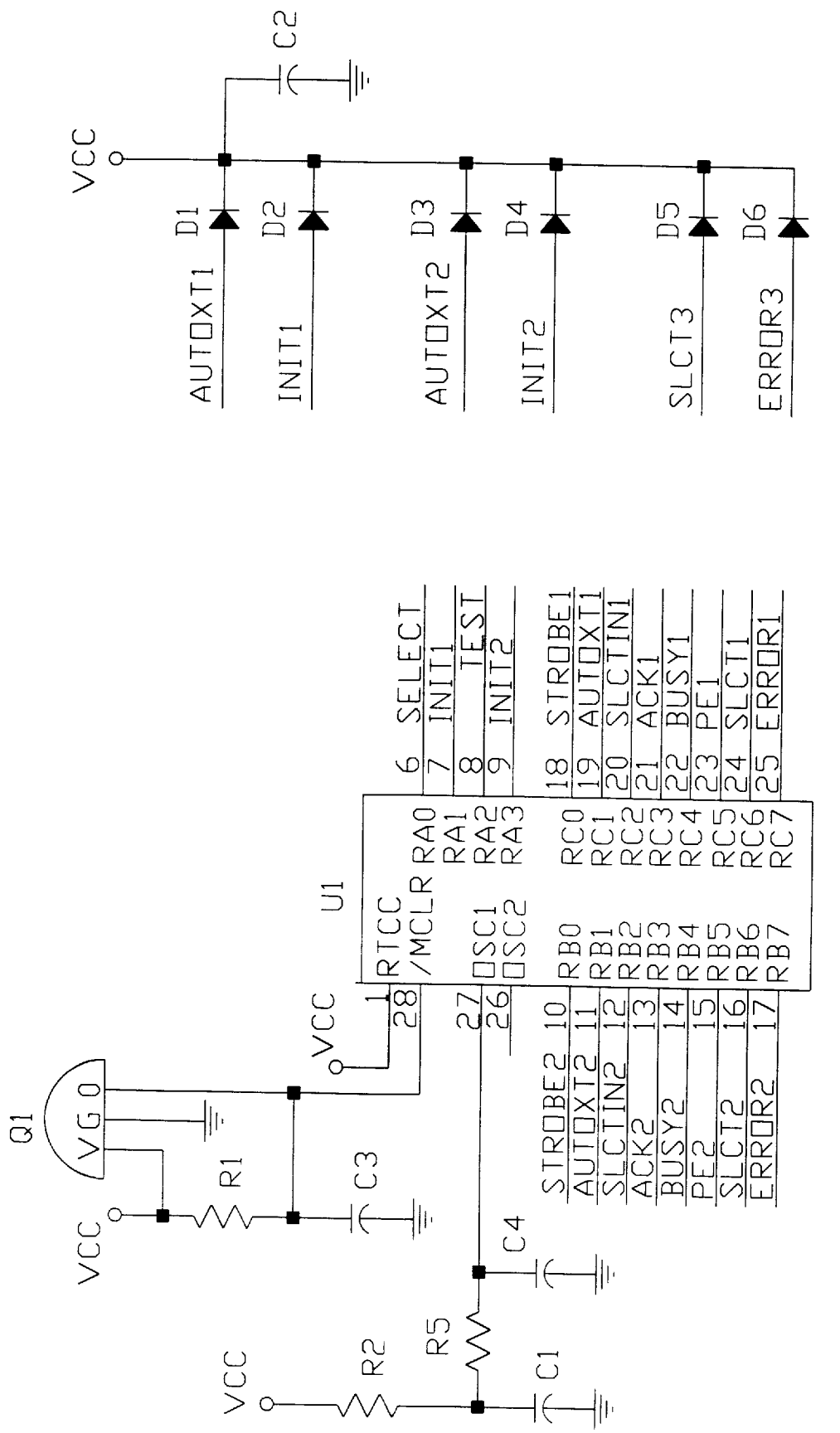

The configuration of connection of pins between connectors and micro controller, and the configuration of pins of the micro controller are shown in FIG. 2. In this figure, RTCC represents REAL TIME CLOCK/COUNTER of U1, which is not used in this embodiment, so that it is used as Vcc input pin of U1. MCLR is MASTER CLEAR RESET pin. OSC1 and OSC2 are clock input pins. RA0~RA3, RB0~RB7 and RC0~RC7 are all I/O pins of U1, and could be set as input or output by a firmware program. In this embodiment, U1 is a micro controller PIC16C57 which has 28 pins. For more clear view, the position of pins are adjusted. The numerals beside the micro controller represent the number of the pins. For example, RTCC is pin 1, MCLR is pin 28, etc. Some pins not related to the present invention are not listed. The left pins RB0~RB7 is connected to pins of CON2. When the Bi-Tronics printer is not connected to computer B, the micro controller will send simulated signals to computer B to deceive it into believing that it is still connected with the Bi-Tronics printer, therefore it will not display error message on screen. Similarly, the right pins RC0~RC7 is connected to CON1. The micro controller sends simulated signals to computer A through these pins, so that computer A will work properly.

Since the micro controller needs a clock, there is an RC oscillator constructed by R2 and C1 to provide an oscillating frequency about 4 MHz to OSC1. C4 and R5 is a filter circuit to avoid high order harmonics. MCLR, which is supplied by transistor Q1 and Vcc, is master clear pin for reset operation when input is low. In this embodiment, transistor Q1 is T518B. It should be noted that, Q1, R1 and C3 could be omitted in general conditions. Q1 is needed to generate reset signal only when the signal is not enough to perform reset operation.

The supply of Vcc is shown in FIG. 3. The present invention does not need any external power supply. Vcc comes from the AUTOXT (AUTO FEED) and INIT pins from the connector of the computer, and from the SLCT3 and ERROR3 pins from the connector of the printer. AUTOXT1 and INIT1 supply the power from the computer A. AUTOXT2 and INIT2 supply the power from the computer B. SLCT3 and ERROR3 supply the power from the connector of the printer. Each power source is connected with a diode (D1~D6). The voltage and current are large enough to suply the power sources to the micro controller.

Figure 4:
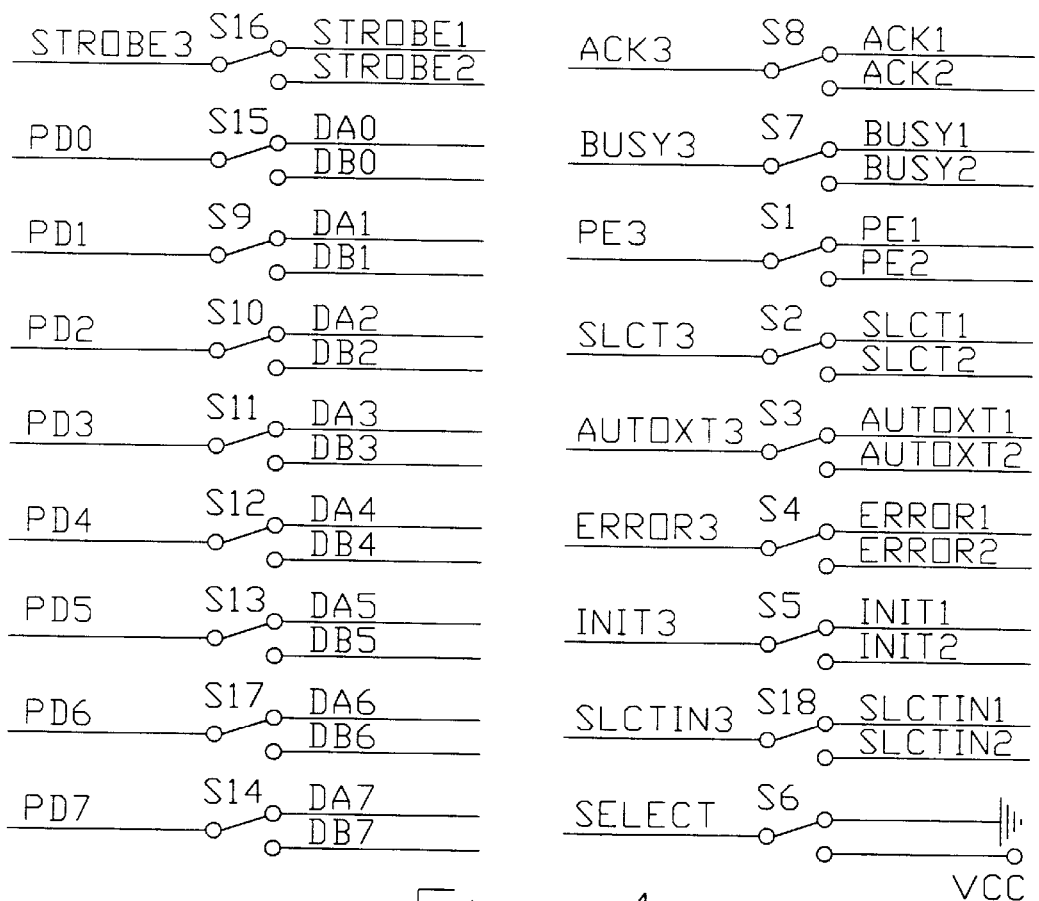

FIG. 4 shows the configuration of connection of switches of the data switch. In this figure, S1~S18 represent 18 contact points and are associated together. The upper contact points means connected to computer A. The lower contact points means connected to computer B. By reference of FIG. 1, except seven parallel-connected ground pins, the 18 lines are all control lines of the output port of the printer. When connected with computer A, pin SELECT of switch S6 becomes low because it is grounded. When connected with computer B, pin SELECT of switch S6 becomes high because it is connected to Vcc. Pin SELECT is connected to RA0 of the micro controller as shown in FIG. 2. RA0 is set to a logic input. The micro controller decides which computer is connected according to the different level of RA0.

Figure 5:
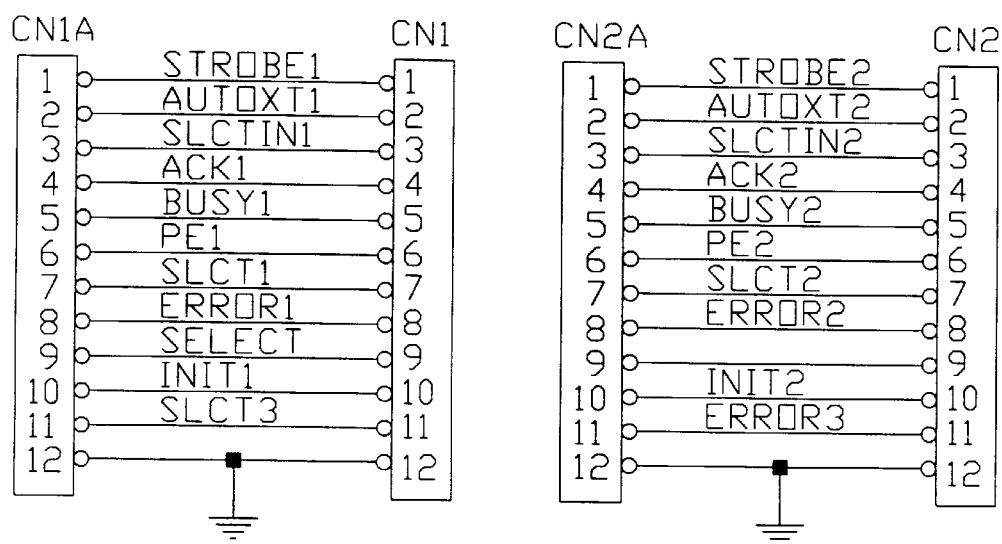

FIG. 5 is a schematic diagram of the connection of the switch and the connectors. CN1 means the connector of computer A. CN2 means the connector of computer B. CN1A and CN2A mean to connect to the pins of the data switch. The numerals 1~12 are the serial numbers of the pins. Pins with serial numbers 1~8, e. g. STROBE~ERROR, are connected to connectors from computers A and B. Pin SELECT comes from pin S6 shown in FIG. 4, and connected with RA0 shown in FIG. 2. INIT1 and INIT2 correspond to RA1 and RA3 shown in FIG. 2. ERROR3 with serial number 10 comes from pin 15 of CON3 of the printer as shown in FIG. 1. Pin with serial number 12 is grounded. RA2 shown in FIG. 2 is a test pin with no other functions.

The connection of pins is described as above in detail. It should be noted that the left pins 10~17 of the micro controller connected to computer B shown in FIG. 2 are connected in parallel on the data switch. Similarly, the pins 18~25 of the micro controller connected to computer A are connected in parallel on the data switch. Besides, pins connected with RA1 and RA3 are connected in parallel. Summing up the above, except some signals used by the micro controller, all the connection between the present invention and the conventional data switch are parallel. Therefore the present invention has the same function of the conventional data switch when the micro controller has no signals output. That is, not only for the Bi-Tronics printer, the present invention could be used as a conventional data switch, so that the present invention is based on the conventional data switch.

Figure 6:
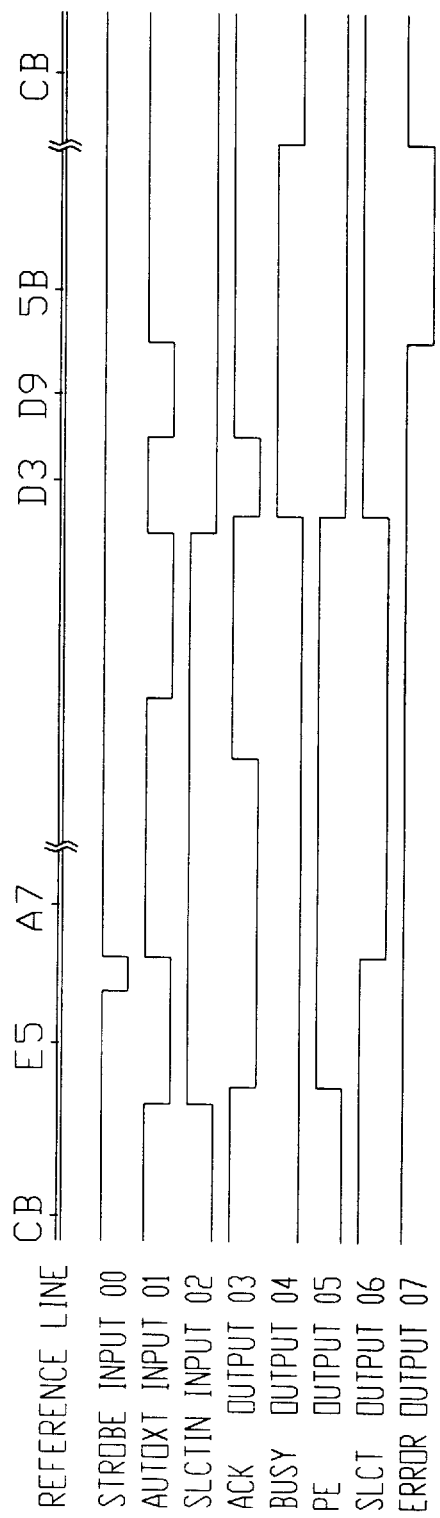
FIG. 6 is a signal diagram of the micro controller used in a Bi-Tronics printer according to the present invention.

FIG. 6 shows a simplest waveform diagram of the micro controller used in the Bi-Tronics printer of HP, to describe how the Bi-Tronics printer communicates with the computer, and how the micro controller simulates pseudo signals to deceive the computer. Although, the waveform the Bi-Tronics printer and the printer driver of different type or different companies may vary, but their principles are the same. Therefore the present invention could use the principle to switch between Bi-Tronics printers in the same way as conventional Centronics printers using data switch.

Figure 7:
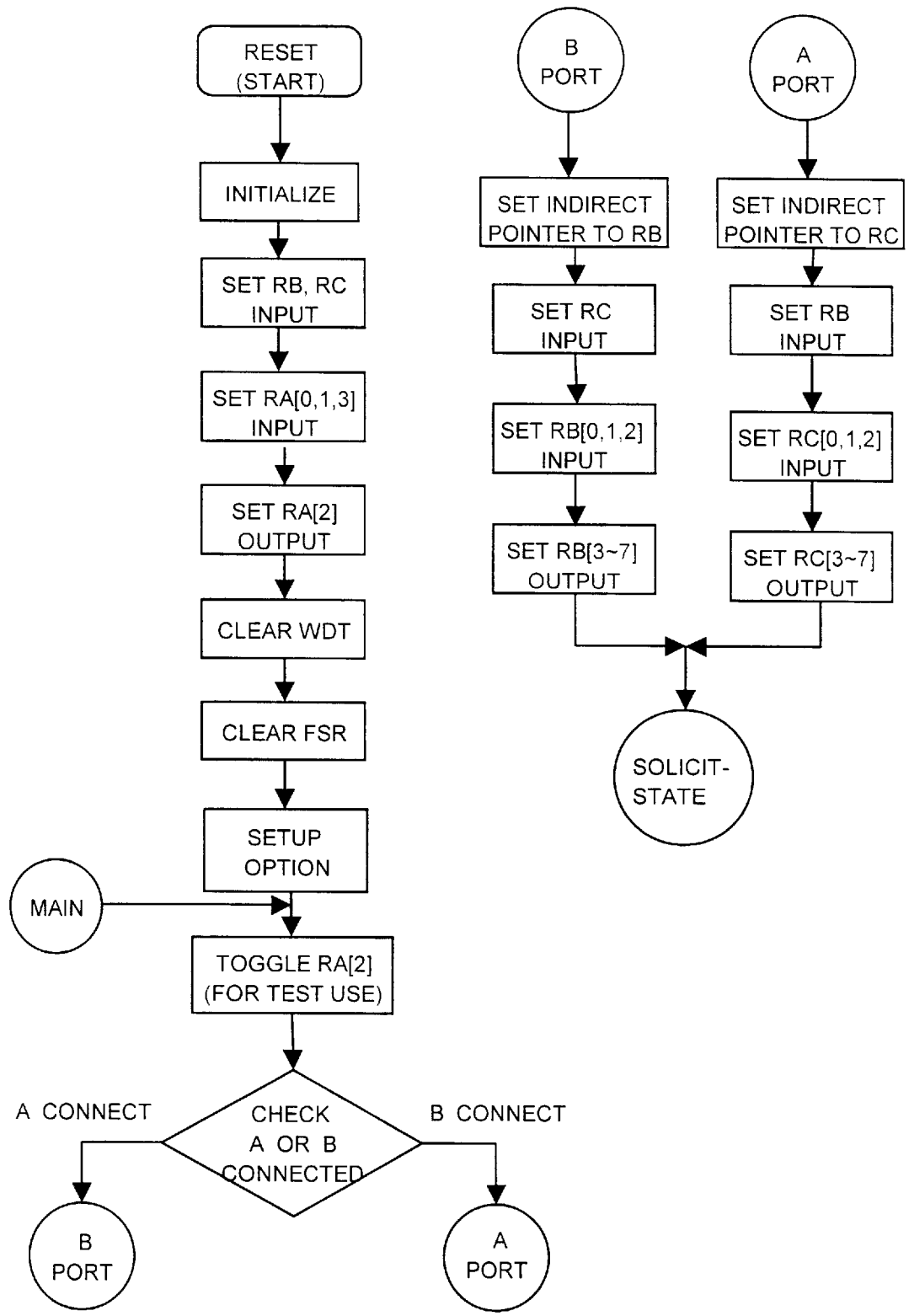
FIGS. 7 to 10 are flow charts of the firmware program illustrating how the micro controller shown in FIG. 6 detects and responds to the input and output signal.

In FIG. 6, INPUT are the request signals from the computer. OUTPUT are the response signals of the micro controller to the computer. The first line is a reference line. Points on the reference line, e.g. CB, E5, etc., are reference points. FIGS. 7 to 10 are flow charts of the firmware program to drive the micro controller U1 in FIG. 2. As shown in FIG. 7, after the micro controller is reset, RB0~RB7 and RC0~RC7 are set to input (RB represents Rbn, RA represents RAn, RC represents RCn), that is no signal output from the micro controller. Then RA0, RA1 and RA3 are set to input. RA2 is set to output test. WDT (watch-dog timer) and FSR (file select register) are cleared. The micro controller is set to stand-by (receiving mode). RA2 is toggled for test. Then the CHECK of the printer is used to detect which computer is connected to printer. If printer is connected with computer A, computer B is disconnected with the printer, and the micro controller should send simulated Bi-Tronics signals to computer B, e.g. B PORT. If printer is connected with computer B, computer A is disconnected with the printer, and the micro controller should send simulated Bi-Tronics signals to computer A, e.g. A PORT. If it is A CONNECT, the program goes to B PORT (simulate Bi-Tronics signals to computer B), and SET INDIRECT (pointer) is pointed to RB. INDIRECT POINTER TO RB means the INDIRECT POINTER is set to F0=RB. Since computer A and printer is connected, RC (connected to computer A) is set to input. Because the circuits are connected in parallel, and the micro controller has no output to computer A, computer A and printer can work properly without disturbance. Since STROBE, AUTOXT and SLCTIN on pins RB0, RB1 and RB2 are request signals of the computer. RB[0,1,2] is set to input, and RB3~RB7 are set to output, preparing to simulate Bi-Tronics signals to computer B to enter SOLICIT-STATE. On the contrary, if computer B is connected with printer, the Bi-Tronics printer signals are simulated to computer A as described above.

Figure 8:
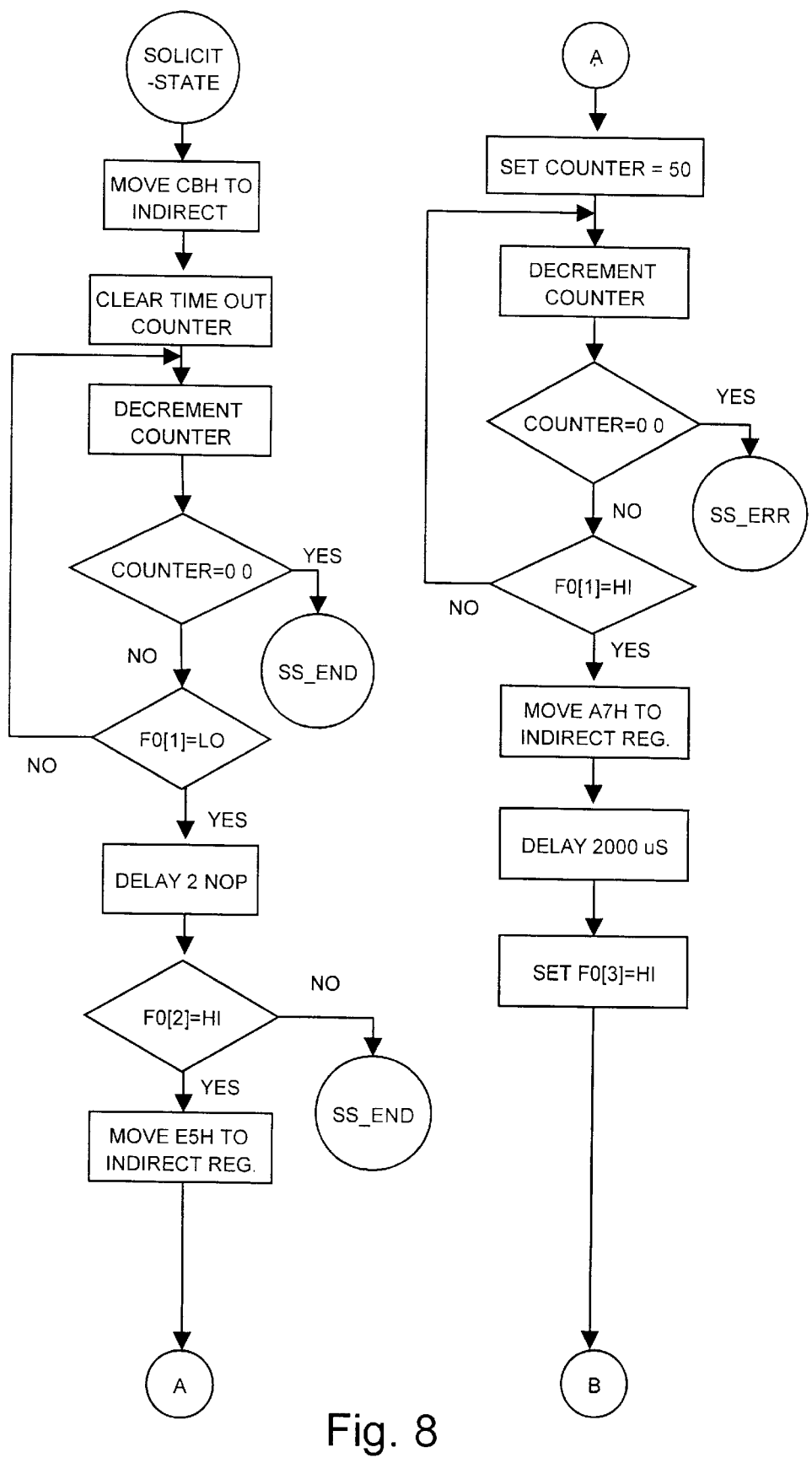
Figure 9:
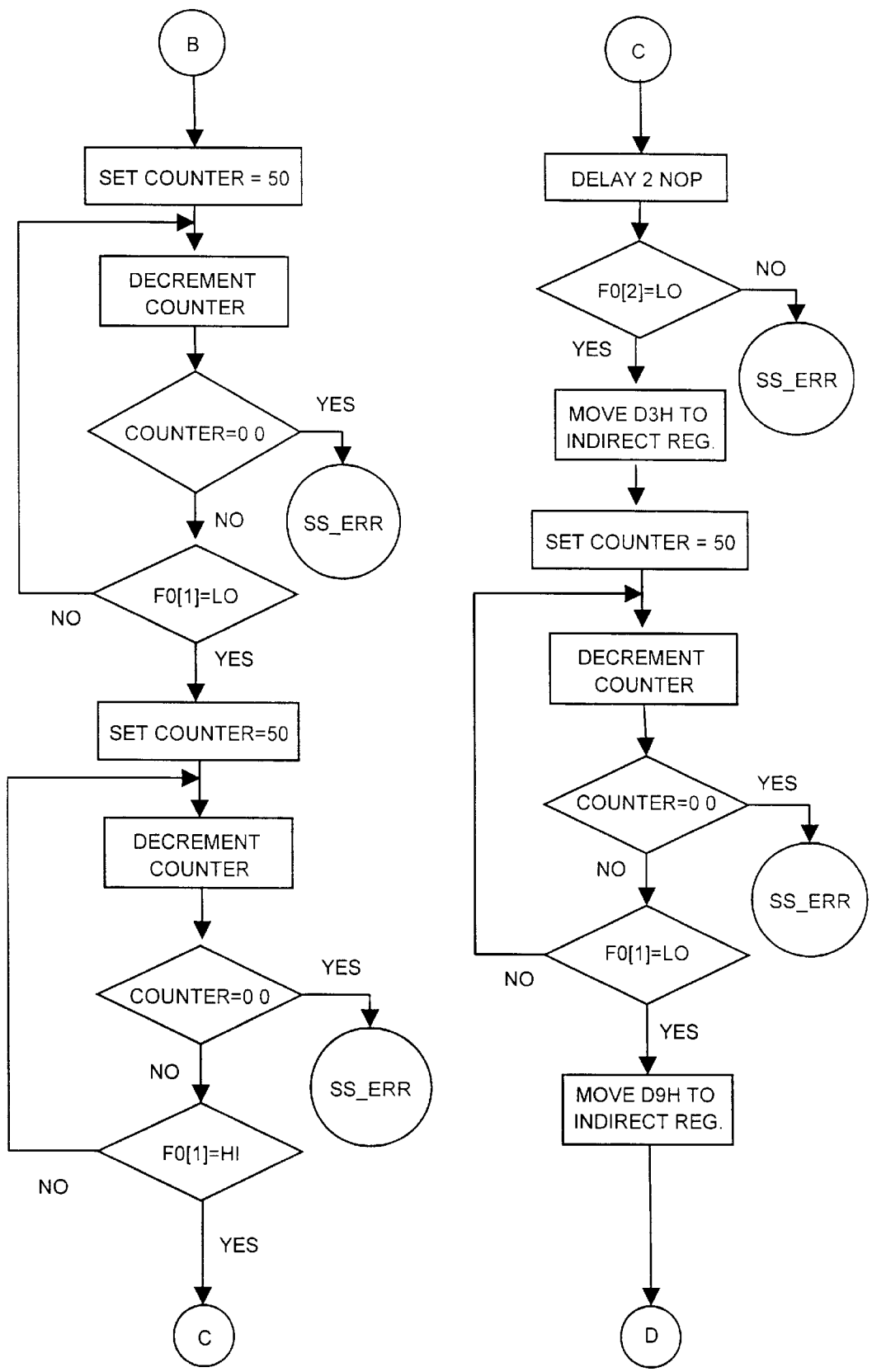
Figure 10:
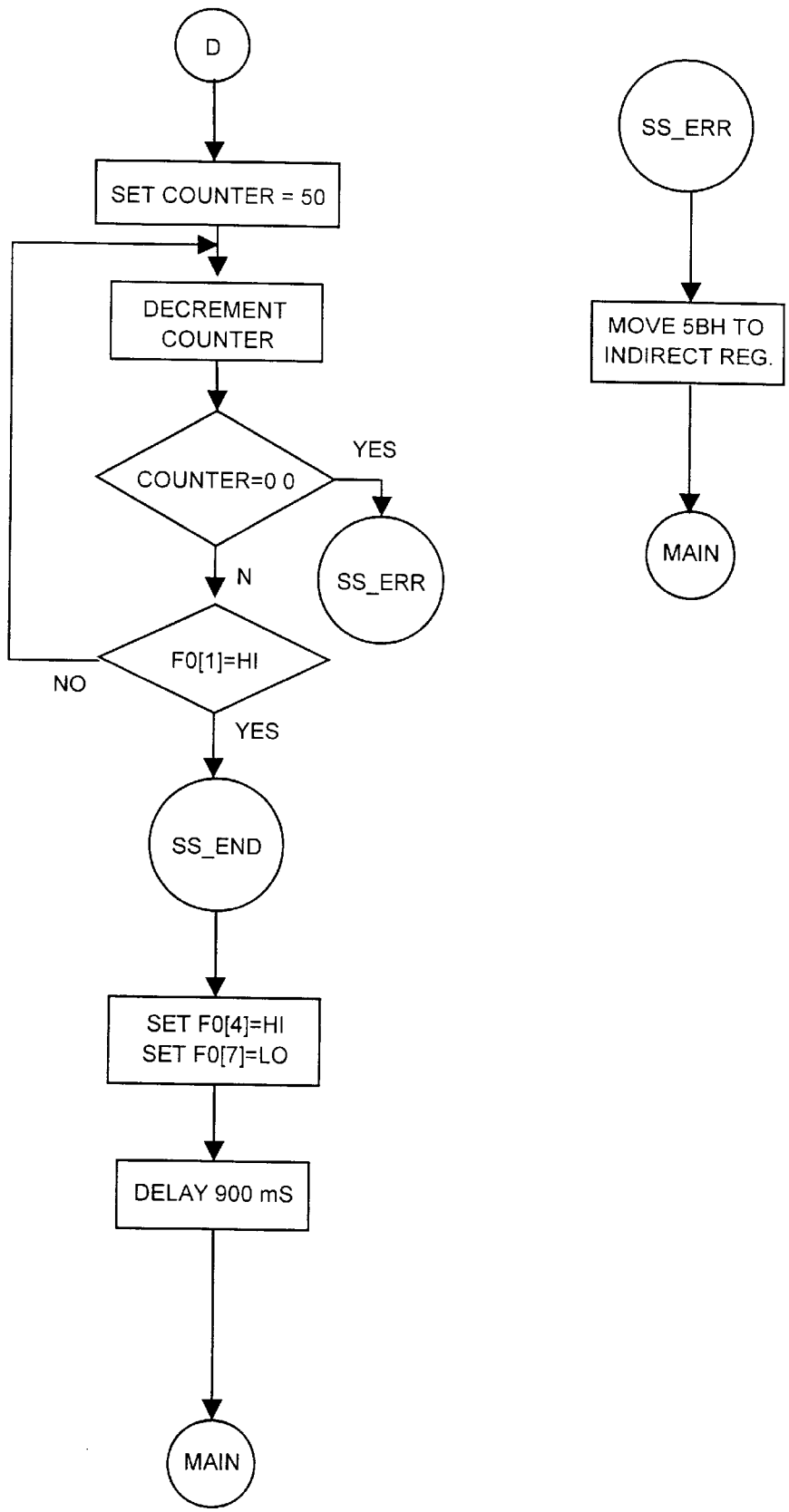

Please refer to FIG. 8. MOVE CBH TO INDIRECT (H represent hexadecimal) means in the beginning the level of the reference points in FIG. 6 from ERROR (07) to STROBE (00) is 1, 1, 0, 0 (e.g. CH), and 1, 0, 1, 1 (e.g. BH). A counter loop is used to test if COUNTER is not 0, then test if AUTOXT is low (F0[1]=LO). If yes, and SLCTIN is high (F0[2]=HI), then E5H (1, 1, 1, 0, 0. 1, 0, 1) is output, wherein the first five digits (1, 1, 1, 0, 0) are used to respond the request signals F0[1]=LO and F0[2]=HI. Similarly, a counter loop is used to test if AUTOXT is high (F0[1]=HI). If yes, A7H (1, 0, 1, 0, 0, 1, 1, 1) is output. After delayed for 2000 µS, ACK is set to high (SET F0[3]=HI). In the same way, as shown in FIG. 9, when AUTOXT turns from low (F0[1]=LO) to high (F0[1]=HI), and SLCTIN is low (F0[2]=LO) at the same time, D3H is output. When F0[1] turns to low, D9H is output. When F0[1] turns to high, the program goes to SS_END as shown in FIG. 10.

The level of F0[1] and F0[2] (01,02) represents different series of request signals from the computers. The waveform of output (03~07) represents different response signals. Since the response signals will make the disconnected computer think that it is still connected with the printer. To prevent the disconnected computer from sending print commands which will cause errors, F0[4] (i.e. BUSY in FIG. 6) is set to high, and F0[7] (i.e. ERROR) is set to low, wherein F0[4]=HI and F0[7]=LO will make the computer think that the printer is still busy, therefore it will not send print commands to the printer. Similarly, joint point SS_ERR will output 5BH, then go to joint point MAIN to repeat the program.

It should be noted that the above description is based on computer A connected to the printer and the computer B is disconnected. The INDIRECT pointer F0=RB. On the contrary, when computer B is connected to the printer and the computer A is disconnected, the INDIRECT pointer F0=RC as shown in FIG. 2, the program is executed according to the flow charts shown in FIGS. 7 to 10, too.

FIGS. 7 to 10 show the flowcharts of this embodiment according to the present invention. Since there could be variations in the circuits and settings of input and output pins of the micro controller, the embodiment shown in FIGS. 1 to 10 is only one of the examples for realizing the present invention. Therefore the scope of the present invention should cover the all possible variations, and the data switching method of allowing a data switch to functionate properly between a computer and a Bi-Tronics printer should be covered, too. The present invention is a data switch adding a controller circuit for using between a computer and a Bi-Tronics printer, the controller circuit comprises: a micro controller, a firmware program to drive the micro controller, a power supply circuit to supply the power to the micro controller, and an oscillating circuit to provide oscillating frequency to the micro controller, wherein the input and output pins of the micro controller are coupled in parallel to the corresponding pins of the data switch, the corresponding pins includes a SELECT pin which is set as a logical select signal pin of the micro controller, STROBE, AUTOXT and SLCTIN pins which are set as input signal pins of the micro controller, and ACK, BUSY, PE, SLCT, and ERROR pins which are set as the Bi-Tronics simulating signal output pins of the micro controller, then by detecting the change of the input signals of the micro controller, the firmware program makes the micro controller generates a simulating respond signal on the output pins of the micro controller, and the simulating respond signal sets the BUSY pin to high and the ERROR pin to low to prevent the computer from sending print commands. The method includes (a) coupling a controller circuit to the data switch in parallel to process signals of the computer; (b) using the signals from the computer and the printer to supply power to the controller circuit; (c) using the signals from the data switch to decide whether the computer is connected or disconnected with the Bi-Tronics printer; (d) using the controller circuit to generate a simulating respond signal of the Bi-Tronics printer to the disconnected computer; and (e) using the signals of the computer to prevent the disconnected computer from sending print commands to the Bi-Tronics printer. Besides, The connection of circuits or the settings of the I/O ports of the micro controller could have different variations, and any simillar micro controllers, IC, CPU, or other kinds of micro controllers, ICs, CPUs or electronic circuits, or the combination of them could be used if they can genrate a simulating respond signal of the Bi-Tronics printer to the disconnected computer, that work(s) like a controller circuit as mentioned above, so that the computer and the Bi-Tronics printer can operate properly. Further more, any conventional data switches, such as manual rotary switch or push switch, or any switches which have the same function used by adding a controller circuit as mentioned above to the Bi-Tronics printer are covered by the present invention.

Figure 11:
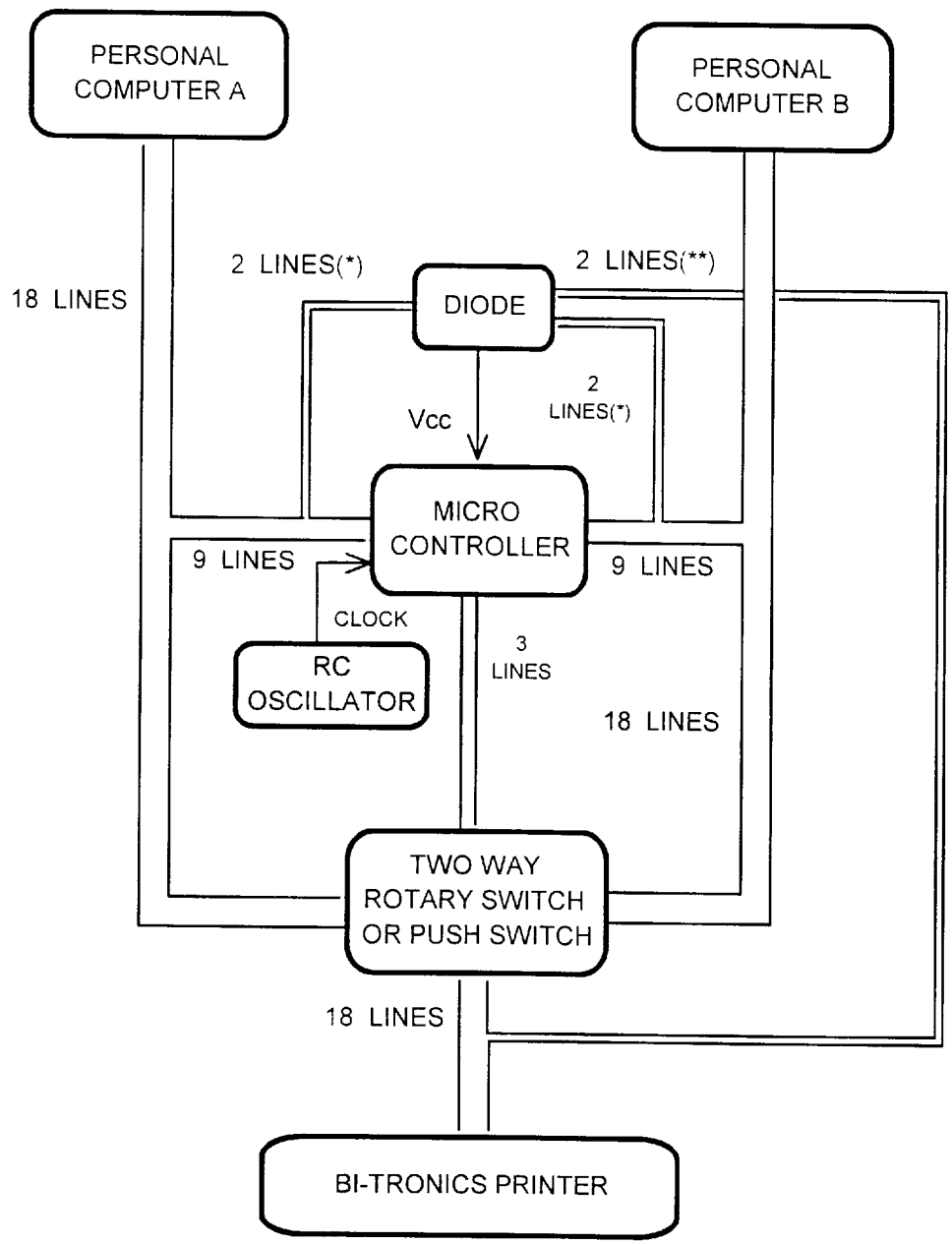
FIG. 11 is a circuit function block diagram of FIGS. 1 to 5 illustrating the whole configuration of the circuits according to the present invention.
Figure 12:
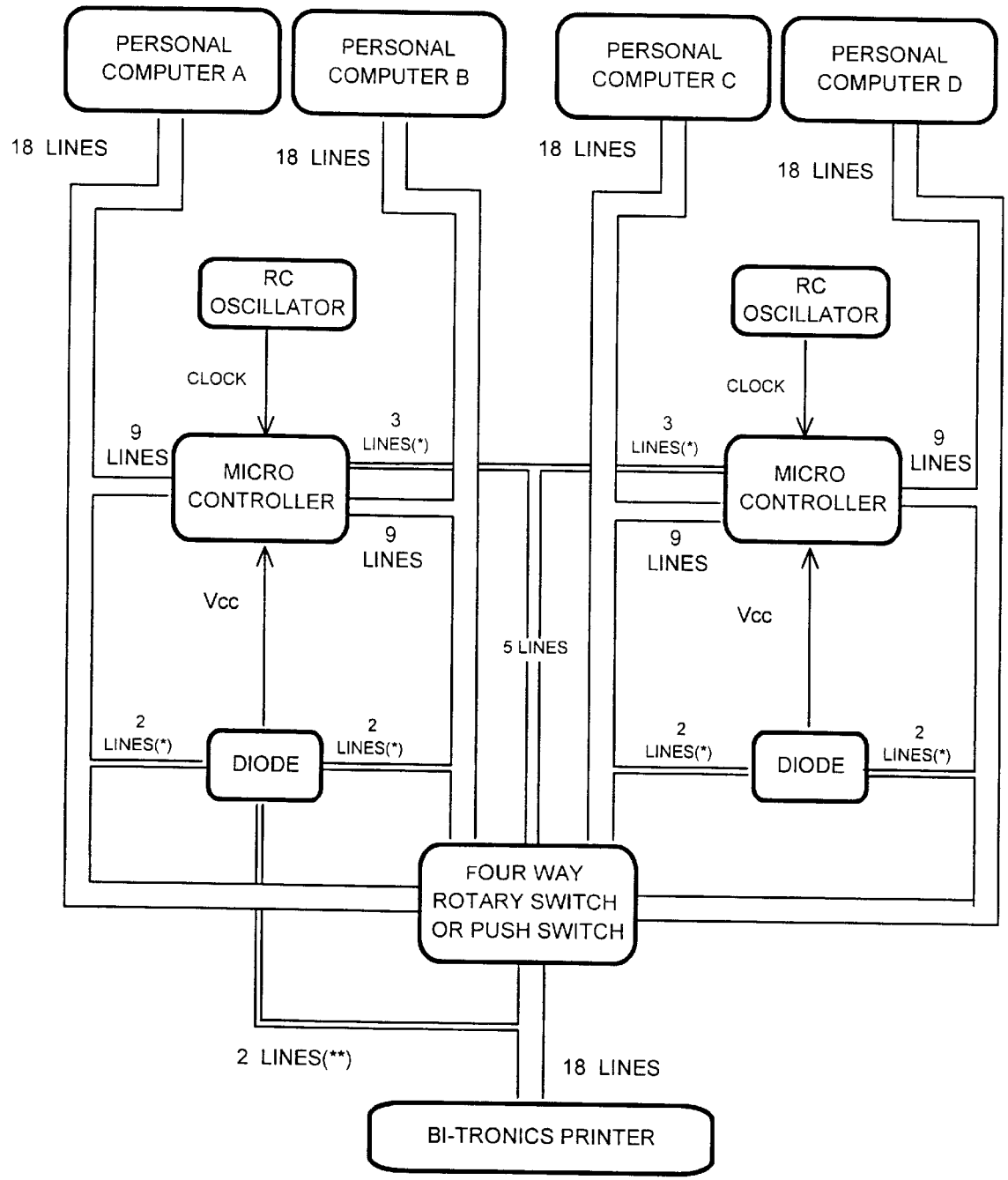
FIG. 12 is another circuit function diagram illustrating a configuration of the circuits used in a four-to-one (four computers sharing one printer) data switch, which represents one of the multiple-to-one conditions.

FIG. 11 is a circuit function diagram of FIGS. 1 to 5 illustrating the whole configuration of the circuits according to the present invention. There are 18 lines connected between the connector of the printer and the switch, wherein 2 LINE(**) are SLCT3 and ERROR3 in FIG. 3. Other descriptions could be found in FIG. 12 or FIGS. 1 to 5. DATA0 in FIG. 12 is corresponding DA0, DB0 or PD0, etc. 9 LINES connected with micro controller are coupled in parallel with computer A and B respectively. The 9 LINES are pins with serial numbers 1~8 and 10 in FIG. 5, or RB0~RB7 and RA3, or RC0~RC7 and RA1 in FIG. 2. 2 LINES(*) of the 9 LINES is coupled in parallel with DIODE, which are AUTOXT and INIT in FIG. 3. Vcc is obtained from the pins connected with the DIODE. The clock of the micro controller is supplied by RC OSCILLATOR. 3 LINES including GROUND, Vcc, and SELECT are retrieved from 18 LINES of ROTARY SWITCH. The description of each line is listed in table I.

TABLE I

| 18 LINES: | | 9 LINES: | 3 LINES: |
|---|---|---|---|
| 1. STROBE | 10. ACK | 1. STROBE | 1. SELECT |
| 2. DATA0 | 11. BUSY | 2. AUTOXT | 2. Vcc |
| 3. DATA1 | 12. PE | 3. SLCTIN | 3. GND |
| 4. DATA2 | 13. SLCT | 4. ACK | 2 LINES(*) |
| 5. DATA3 | 14. AUTOXT | 5. BUSY | 1. AUTOXT |
| 6. DATA4 | 15. ERROR | 6. PE | 2. INIT |
| 7. DATA5 | 16. INIT | 7. SLCT | 2 LINES(**) |
| 8. DATA6 | 17. SLCTIN | 8. ERROR | 1. SLCT |
| 9. DATA7 | 18. GND | 9. INIT | 2. ERROR |

FIG. 12 is another circuit function diagram illustrating a configuration of the circuits used in a four-to-one (four computers sharing one printer) data switch. The data switch consists of two micro controllers and one four-way switch. Vcc is supplied by DIODE connected to 2 LINES(*) and 2 LINES(**). 9 LINES of the left micro controller is coupled to computer A and B. 9 LINES of the right micro controller is coupled to computer C and D. Each micro controller has one RC OSCILLATOR. 3 LINES(*) include one GROUND, are connected between the four-way switch and the two micro controllers to provide signals for the micro controllers to decide which computer is connected. The two-to-one data switch uses Vcc and GND to decide which computer is connected. The four-to-one data switch uses other pins to decide which computer is connected.

Figure 13:
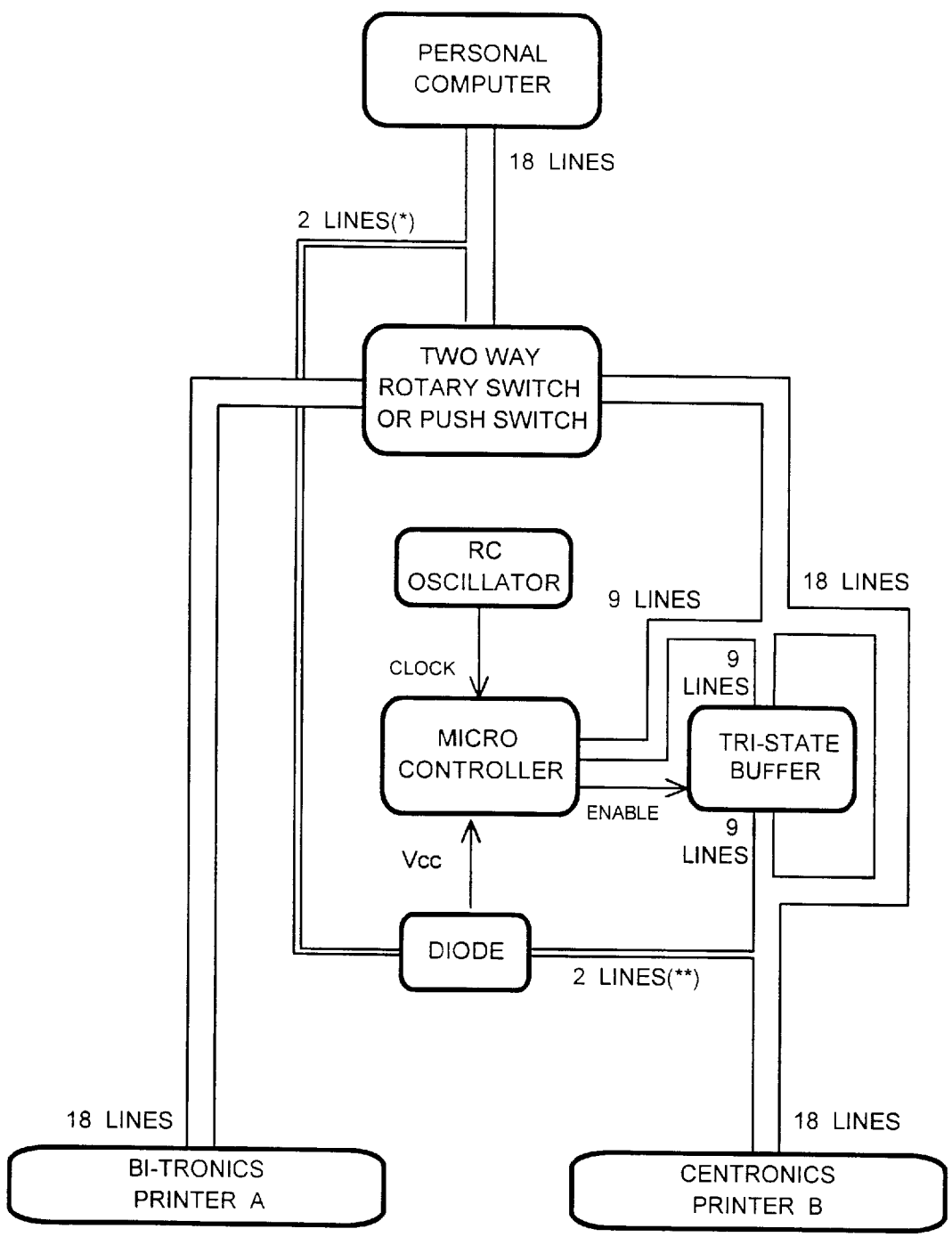
FIG. 13 is another circuit function diagram illustrating a configuration of the circuits used in a one-to-two (one computer using two printers) data switch, which represents one of the one-to-multiple conditions.

FIG. 13 is another circuit function diagram illustrating a configuration of the circuits used in a one-to-two (one computer using two printers) data switch. Except 9 LINES are coupled in parallel with 18 LINES of the computer, a TRI-STATE BUFFER is coupled in parallel with 9 LINES, its ENABLE signal is input from the output of the micro controller.

Figure 14:
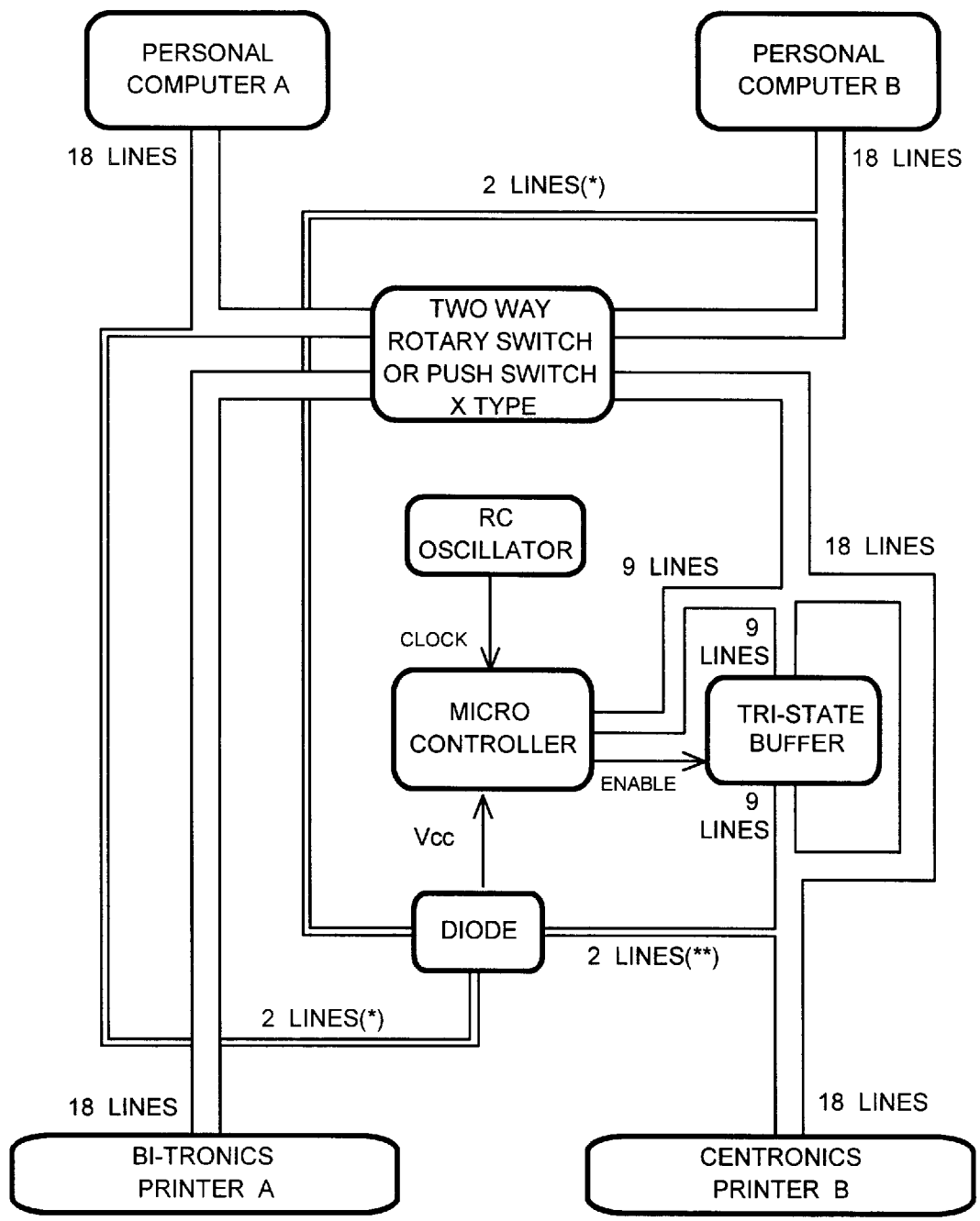
FIG. 14 is another circuit function diagram illustrating a configuration of the circuits used in a two-to-two (two computers sharing two printers) data switch, which represents one of the multiple-to-multiple conditions.

FIG. 14 is another circuit function diagram illustrating a configuration of the circuits used in a two-to-two (two computers sharing two printers) data switch. 18 LINES of computers A and B are connected with the rotary switch. 18 LINES of printers A and B are connected with the rotary switch. Vcc of the micro controller comes from 2 LINES connected with DIODE, wherein 2 LINES(*) come from computers A and B, 2 LINES (**) come from printer B, and a TRI-STATE BUFFER is connected to 9 LINES as an I/O port. Since it is a two-to-two condition, the switch is an X type two way switch.

While the invention has been described by way of example and in terms of preferred embodiment, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A data switch adding a controller circuit for using between a computer and a Bi-Tronics printer, the controller circuit comprises: a micro controller, a firmware program to drive the micro controller, a power supply circuit to supply the power to the micro controller, and an oscillating circuit to provide oscillating frequency to the micro controller, wherein the input and output pins of the micro controller are coupled in parallel to the corresponding pins of the data switch, the corresponding pins includes a SELECT pin which is set as a logical select signal pin of the micro controller, STROBE, AUTOXT and SLCTIN pins which are set as input signal pins of the micro controller, and ACK, BUSY, PE, SLCT, and ERROR pins which are set as the Bi-Tronics simulating signal output pins of the micro controller, then by detecting the change of the input signals of the micro controller, the firmware program makes the micro controller generate a simulating respond signal on the output pins of the micro controller, and the simulating respond signal sets the BUSY pin to high and the ERROR pin to low to prevent the computer from sending print commands.

2. A data switch adding a controller circuit for using between a computer and a Bi-Tronics printer as claimed in claim 1, wherein the power supply circuit is connected to each of the AUTOXT, INIT, SLCT and ERROR pins through a diode to obtain power from the computer and the printer.

3. A data switch adding a controller circuit for using between a computer and a Bi-Tronics printer as claimed in claim 1, wherein the oscillating circuit is an RC oscillating circuit to provide the oscillating frequency for driving the controller circuit.

* * * * *